(12) United States Patent
Martinez

(10) Patent No.: US 6,720,948 B2
(45) Date of Patent: Apr. 13, 2004

(54) METHOD, PROGRAM, AND SYSTEM FOR COMMUNICATING BETWEEN A POINTING DEVICE AND A HOST COMPUTER

(75) Inventor: Anthony Edward Martinez, Spicewood, TX (US)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 09/975,190

(22) Filed: Oct. 11, 2001

(65) Prior Publication Data

US 2003/0071782 A1 Apr. 17, 2003

(51) Int. Cl.[7] .................................................. G09G 5/00

(52) U.S. Cl. ....................... 345/156; 345/169

(58) Field of Search ................................ 345/156–179, 345/184; 341/22–26, 176; 74/471 XY; 348/14.05

(56) References Cited

U.S. PATENT DOCUMENTS

| | | | | |
|---|---|---|---|---|
| 4,924,216 A | * | 5/1990 | Leung | .......................... 463/38 |
| 5,063,376 A | | 11/1991 | Chang | |
| 5,457,478 A | | 10/1995 | Frank | |
| 5,457,480 A | | 10/1995 | White | |
| 5,481,265 A | * | 1/1996 | Russell | ......................... 341/22 |
| 6,137,476 A | * | 10/2000 | Hocker et al. | ............... 345/163 |
| 6,137,479 A | | 10/2000 | Olsen et al. | |
| 6,346,934 B1 | * | 2/2002 | Wugofski | .................... 345/158 |
| 2002/0097225 A1 | * | 7/2002 | Muranami | ................... 345/166 |

* cited by examiner

Primary Examiner—Richard Hjerpe
Assistant Examiner—Alexander Eisen
(74) Attorney, Agent, or Firm—Cardinal Law Group; David A. Mims, Jr.

(57) ABSTRACT

A method, program, and system for communicating between a host computer and a pointing device is provided. The program receives a control signal from a toggle-actuated mechanism operably connected to the pointing device. The program initiates data transfer between the pointing device and the host computer in response to the control signal. The program transfers data between the pointing device and the host computer via an infrared data link.

12 Claims, 11 Drawing Sheets

METHOD, PROGRAM, AND SYSTEM FOR COMMUNICATING BETWEEN A POINTING DEVICE AND A HOST COMPUTER

TECHNICAL FIELD OF THE INVENTION

In general, the invention relates to a method of communicating between a pointing device and a host computer.

BACKGROUND OF THE INVENTION

The use of a computer pointing device such as a mouse, trackball, or stylus pen are very common in computing today. One common use of a pointing device is to mark an object displayed on a computer screen for insertion into a clipboard. A clipboard is typically a temporary storage location in the computer that provides the user with a method of transferring data. Common commands associated with clipboards include cut, copy, and paste. The cut command instructs the computer to remove a marked object and place it in the clipboard. A copy command instructs the computer to place a copy of the object into the clipboard leaving the original object on the display. A paste command instructs the computer to place an object stored in the clipboard onto the display at a location indicated by the user. While there are other commands associated with clipboards, most are a variation of the cut, copy and paste commands.

In general, an operator will use a pointing device to move a display position indicator to an object shown on the display. By pressing control buttons on the pointing device and maneuvering the display position indicator, an object on the display may be marked. Once an object has been marked, it may be transferred into a clipboard using a cut or copy command. One method of executing a cut or copy command is to select a display icon representing the desired command. In some applications, the cut and copy icons may not be displayed until an edit window is displayed. Another method of executing a cut or copy command is by typing the desired command on a keyboard. Once the object has been placed in the clipboard, the user may indicate a location to insert the object. The user may then execute a paste command by selecting a display icon representing the paste command or by typing the command on a keyboard.

One drawback with this method of transferring data to and from a clipboard is that it is not obvious to the operator how to execute the clipboard commands. Also, when the clipboard command is known, executing the command requires the operator to focus their attention away from the object being edited.

What is therefore needed is a method, which overcomes the above disadvantages.

SUMMARY OF THE INVENTION

One aspect of the invention provides a method of communicating between a host computer and pointing device. A control signal from a toggle-actuated mechanism operably connected to the pointing device may be received. Data transfer between the pointing device and the host computer may be initiated. Data between the pointing device and the host computer may be transferred via an infrared data link. The control signal may comprise a receive data signal to initiate a transfer of marked data from the computer to the pointing device. The control signal may comprise a send data signal to initiate a transfer of marked data from the pointing device to the computer.

Another aspect of the invention provides computer usable medium including a program for communicating between a host computer and pointing device. The computer usable medium may include computer readable code for receiving a control signal from a toggle-actuated mechanism on the pointing device, for initiating data transfer between the pointing device and the host computer in response to the control signal, and for transferring data between the pointing device and the computer via an infrared data link. The control signal may comprise a receive data signal to initiate a transfer of marked data from the computer to the pointing device. The control signal may comprise a send data signal to initiate a transfer of marked data from the pointing device to the computer.

Another aspect of the invention provides a pointing device for communicating with a host computer. The pointing device may include: a controller, a memory operably attached to the controller, and a toggle mechanism operably attached to the controller. A control signal may be sent from the toggle mechanism to the controller to initiate data transfer between the host computer and the memory.

An infrared receiver and transmitter operably connected to the controller may allow transfer of data between the pointing device and the computer. The toggle mechanism may send a receive data signal when pulled in a position towards the center of the pointing device. The toggle mechanism may send a send data signal when pressed in a position away from center of the pointing device.

The toggle mechanism may be operably moved between a neutral position, receive data position, and a send data position.

The foregoing and other features and advantages of the invention will become further apparent from the following detailed description of the presently preferred embodiments, read in conjunction with the accompanying drawing.

DETAILED DESCRIPTION OF THE PRESENTLY PREFERRED EMBODIMENTS

One embodiment of a system for communicating between a pointing device and a host computer is illustrated in FIG.

Figure 3:
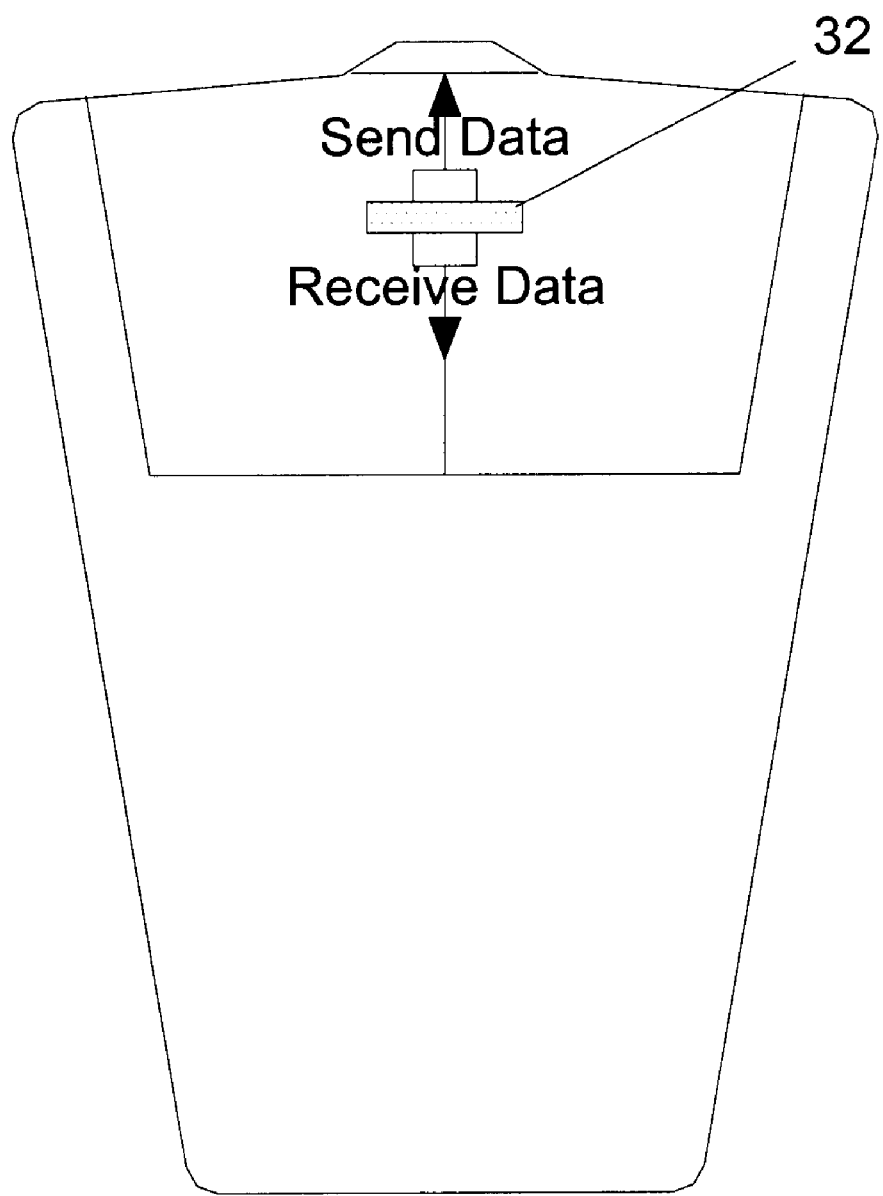
FIG. 3 is a perspective top view of one embodiment of a pointing device, in accordance with the invention.
Figure 4:
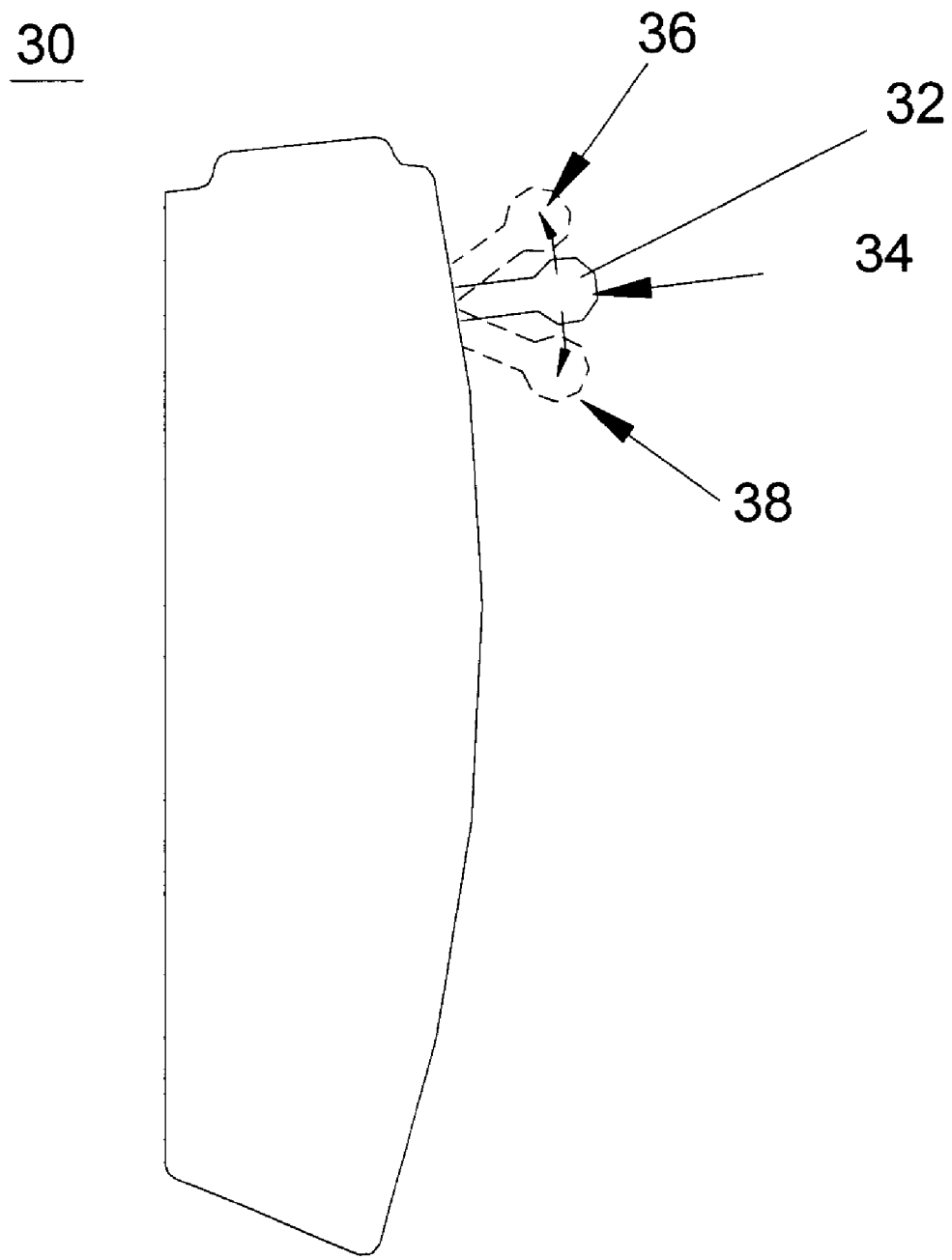
FIG. 4 is a perspective side view of one embodiment of a pointing device, in accordance with the invention.

1 and designated in the aggregate as numeral 10. The system may include computer hardware and software to receive a control signal from a toggle-actuated mechanism operably connected to a pointing device, initiate data transfer, and transfer data between the pointing device and the host computer. Referring to FIGS. 3 and 4. Pressing the toggle mechanism 32 into a send data position 36, towards the computer 12, may result in data transfer from the pointing device 30 to the computer 12. Pulling the toggle mechanism 32 into a receive data position 38, away from the computer 12, may result in data transfer from the computer 12 to the pointing device 30.

Figure 1:
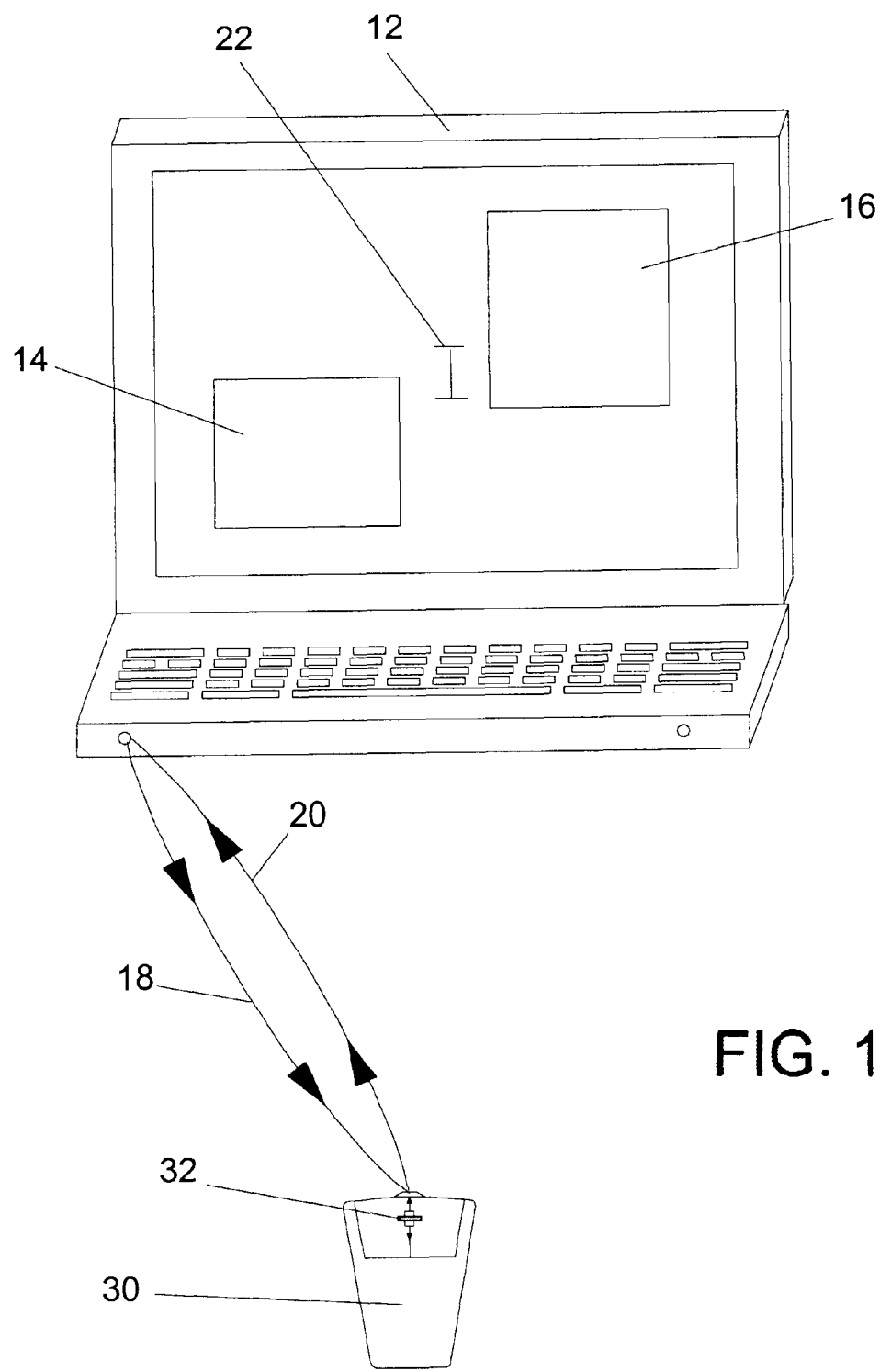
FIG. 1 is a perspective view of one embodiment of a system for communicating between a host computer and a pointing device.

Referring now to FIG. 1, in one embodiment, an object 16 on a display of a host computer 12 may be marked. A toggle mechanism 32 on a pointing device 30 may be moved to a receive data position. The pointing device 30 may be a mouse, trackball, stylus pen, or any pointing device used to move a display position indicator on a computer display. Moving the toggle mechanism 32 to the receive data position may cause a receive data signal to be sent to a controller on-board the pointing device 30. The controller may respond to the receive data signal by sending a receive data command to a computer 12 via an infrared data link 20. The host computer 12 may receive the receive data command and send an acknowledgement to the pointing device via an infrared data link 18. The pointing device controller may receive the acknowledgement and prepare to receive data. The host computer 12 may then send the data of the marked object 16 to the pointing device 30 via an infrared data link 18. The pointing device controller may receive the data and store the data in a memory device.

A cursor 22 on the display of the host computer 12 may be positioned to a location where the object stored in the pointing device 30 is to be inserted. The toggle mechanism 32 on the pointing device 30 may be moved to a send data position. Moving the toggle mechanism 32 to the send data position may cause a send data signal to be sent to a controller on-board the pointing device. The controller may respond to the send data signal by sending a send data command to the host computer 12 via an infrared data link 20. The host computer 12 may receive the send data command and send an acknowledgement to the pointing device via an infrared data link 18. The pointing device controller may receive the acknowledgement and send the data of the object stored in the pointing device's memory to the host computer 12 via an infrared data link 20. The host computer 12 may receive the data of the object and insert the object 14 at a location on the display screen at a location specified by the cursor location. Those skilled in the art will recognize that the data stored in the pointing device may be sent to any number of compatible computers.

Figure 2:
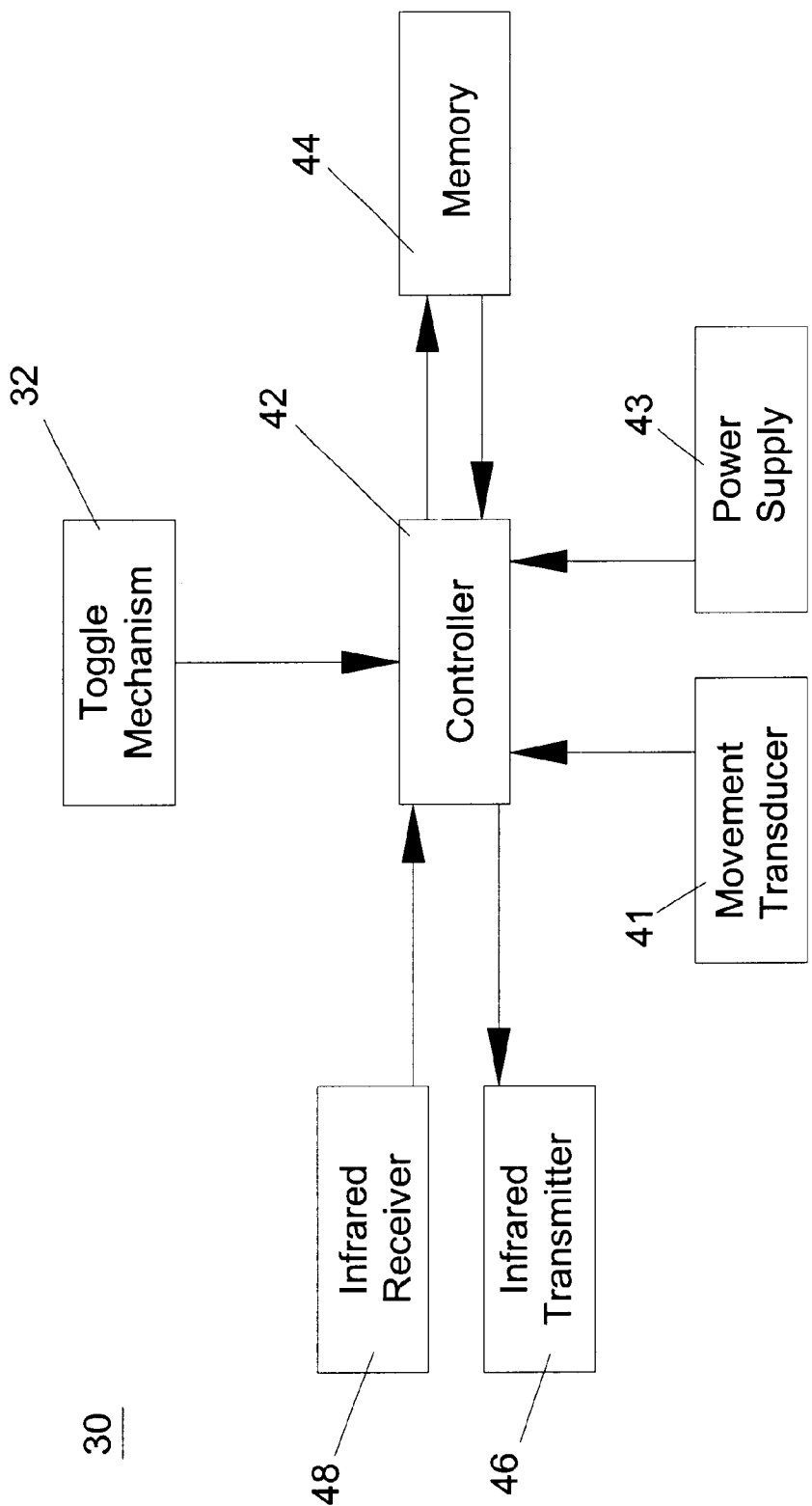
FIG. 2 is a block diagram of one embodiment of a pointing device, in accordance with the invention.

One embodiment of a pointing device for communicating with a host computer is illustrated in FIG. 2 and designated in the aggregate as numeral 30. The pointing device may include: a toggle mechanism 32, a controller 42, an infrared receiver 48, an infrared transmitter 46, and a memory device 44.

The pointing device 30 may include a toggle-actuated mechanism 32. In one embodiment, a toggle-actuated mechanism 32 may comprise a double throw single pole toggle switch with a neutral center position. The toggle switch may be operably connected to a controller. Referring to FIGS. 3 and 4, when the toggle switch is in the neutral position 34, no signal may be sent to the controller. When the toggle switch is moved into the send data position 36, a send data signal may be sent to the controller. The send data position 36 may be in a position towards the computer when the pointing device is pointed in the direction of the computer. When the toggle switch is moved into the receive data position 38, a receive data signal may be sent to the controller. The receive data position 38 may be in a position away from the computer when the pointing device is pointed in the direction of the computer. Those skilled in the art will recognize that alternate switch configurations may be used to accomplish the switching function of the double throw single pole toggle switch. Alternate switch configurations may include: a double throw multiple pole toggle switch, three position slide switches, a plurality of momentary contact switches or the like.

The pointing device 30 may include an infrared receiver 48. In one embodiment, the infrared receiver 48 may comprise a photodiode. The photodiode may be connected to an input of the controller. The photodiode may have a peak sensitivity wavelength in the infrared range. The peak sensitivity wavelength may match the wavelength emitted by the infrared device on a host computer. Those skilled in the art will recognize that a phototransistor or other infrared sensitive device may be used to receive infrared signals.

The pointing device 30 may include an infrared transmitter 46. In one embodiment, the infrared transmitter 46 may comprise a light emitting diode. The light emitting diode may be connected to an output of the controller. The light emitting diode may have a peak emission wavelength in the infrared range. The peak emission wavelength may match the peak sensitivity wavelength of the infrared device on a host computer. Those skilled in the art will recognize that information may be communicated to the host computer via wires or radio waves.

The pointing device 30 may include a memory device 44. In one embodiment, the memory device 44 may comprise a printed wiring board with operably attached memory integrated circuits. The printed wiring board may be electrically connected to the controller. The printed wiring board may be removable. The printed wiring board and connections may be compatible with a PCMIA format. Those skilled in the art will recognize that using a removable memory device may allow transferring data by removing the memory device from the pointing device and installing the memory device in a host computer. They will also recognize that magnetic diskettes, magnetic tape, optical storage devices, or other computer storage medium may be used to store the data.

The pointing device 30 may include a controller 42. In one embodiment, the controller 42 may comprise: a Central Processing Unit (CPU), a plurality of inputs, a plurality of outputs, and memory.

Figure 5:
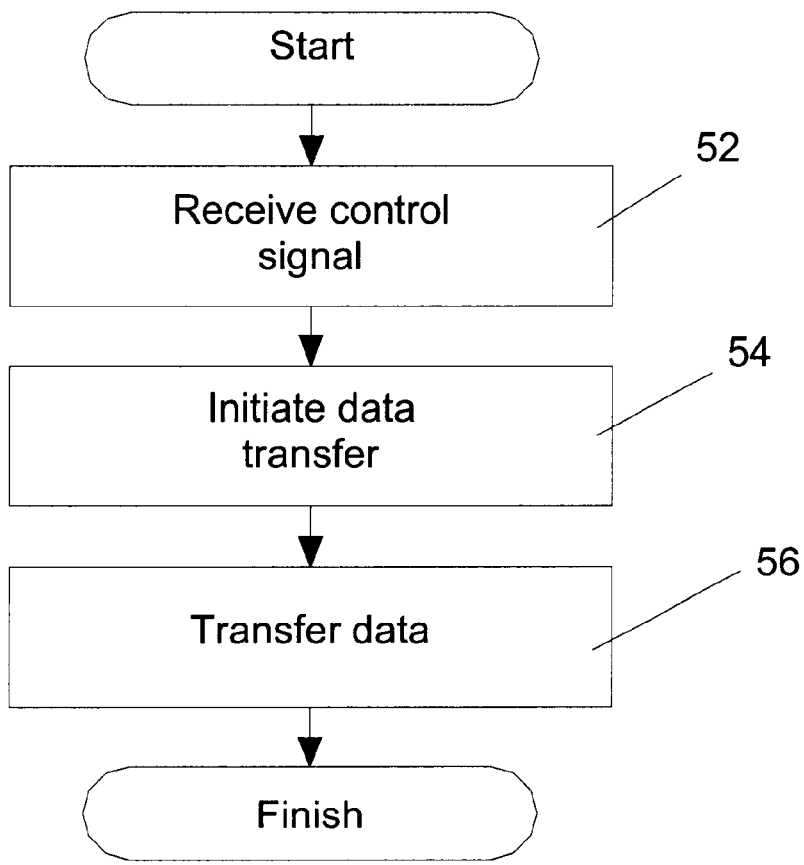
FIG. 5 is a flow chart indicating the processing by a pointing device in one embodiment of the invention.

One embodiment of a pointing device program for communicating with a host computer is illustrated in the flow chart of FIG. 5 and designated in the aggregate as numeral 50. The computer program may receive a control signal, initiate data transfer, and transfer data to and from a host computer.

Figure 6:
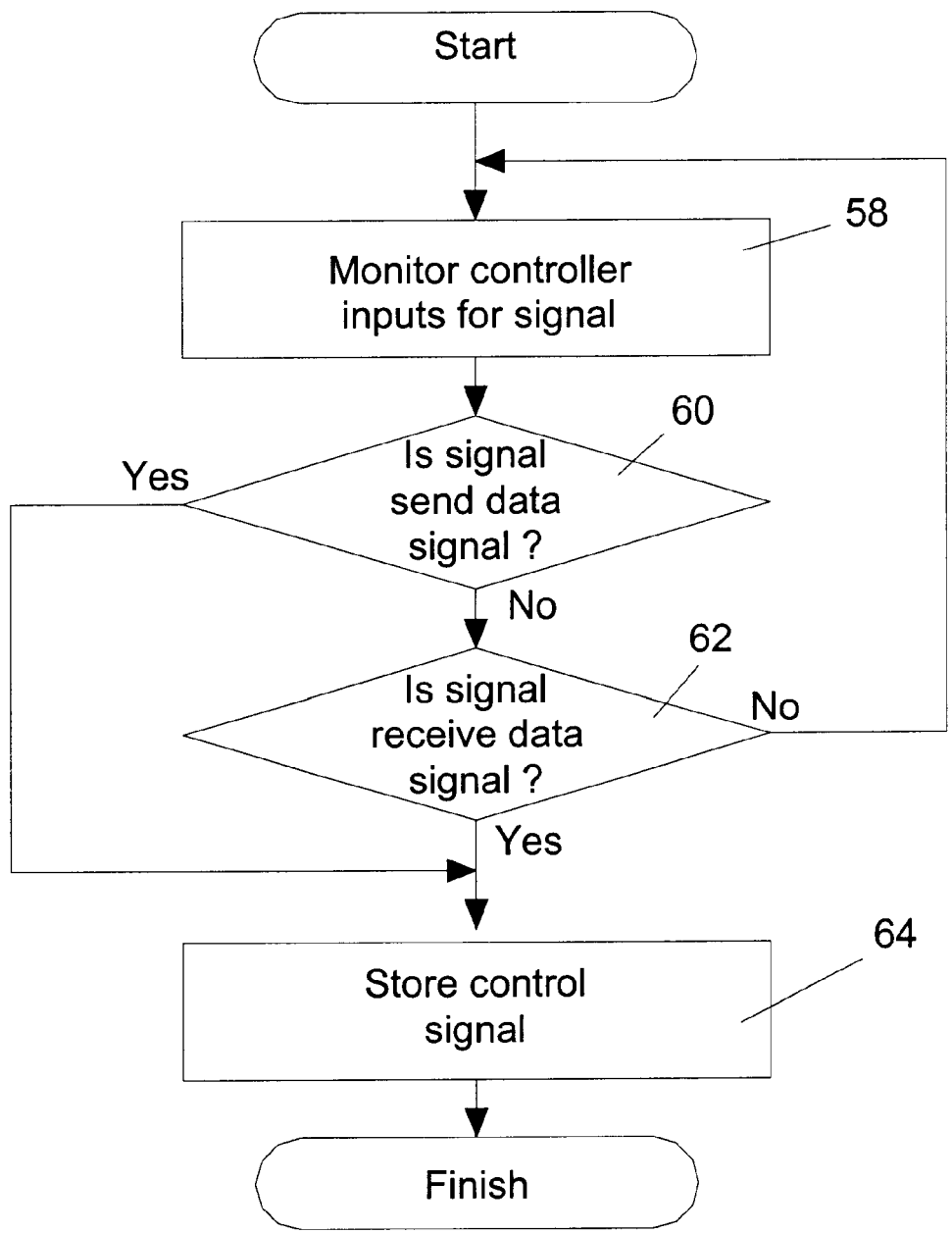
FIG. 6 is a flow chart of a routine of the procedure "Receive control signal" shown in the flow chart of FIG. 5.

The pointing device program 50 may receive a control signal 52. Referring to FIG. 6. The pointing device program 50 may monitor the controller inputs connected to the toggle mechanism for a signal 58. Upon receiving a signal, the program may determine if the signal is a send data signal 60. If the signal is a send data signal, the program may store the signal for later processing 64. If the signal is not a send data signal, the program may determine if the signal is a receive data signal 62. If the signal is not a receive data signal, the program may continue monitoring the inputs for a signal 58. If the signal is a receive data signal, the program may store the signal for later processing 64.

Figure 7:
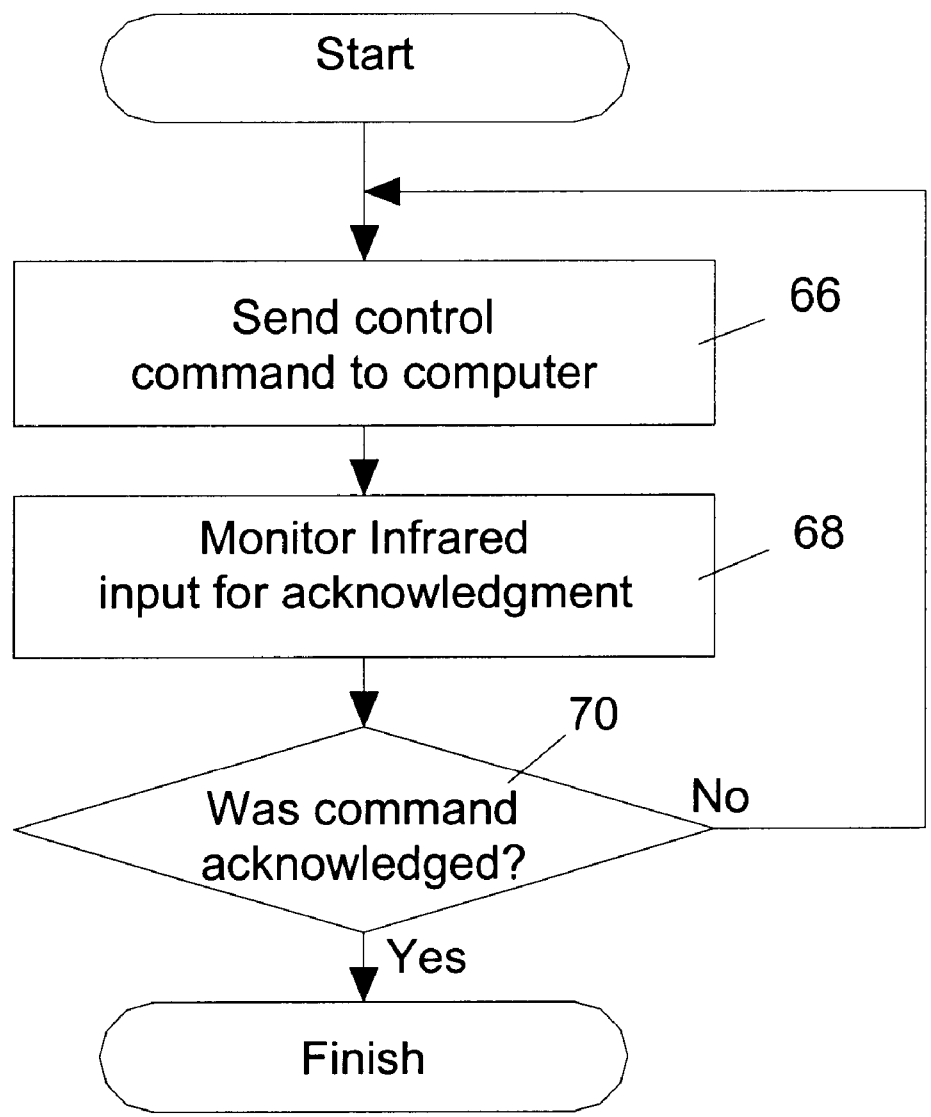
FIG. 7 is a flow chart of a routine of the procedure "Initiate data transfer" shown in the flow chart of FIG. 5.

The pointing device program 50 may initiate data transfer 54 with a host computer. Referring to FIG. 7. In one embodiment, the pointing device program 50 may send a control command to the outputs of the controller connected to the infrared transmitter 66. The control command may reflect whether a receive data or send data signal was received from the toggle actuated mechanism. The pointing device program 50 may monitor the controller input connected to the infrared receiver for an acknowledgement 68. If the command was not acknowledged 70, the program may send the control command to the outputs of the controller connected to the infrared transmitter 66. If the command was acknowledged 70, the program may prepare to receive or send data.

Figure 8:
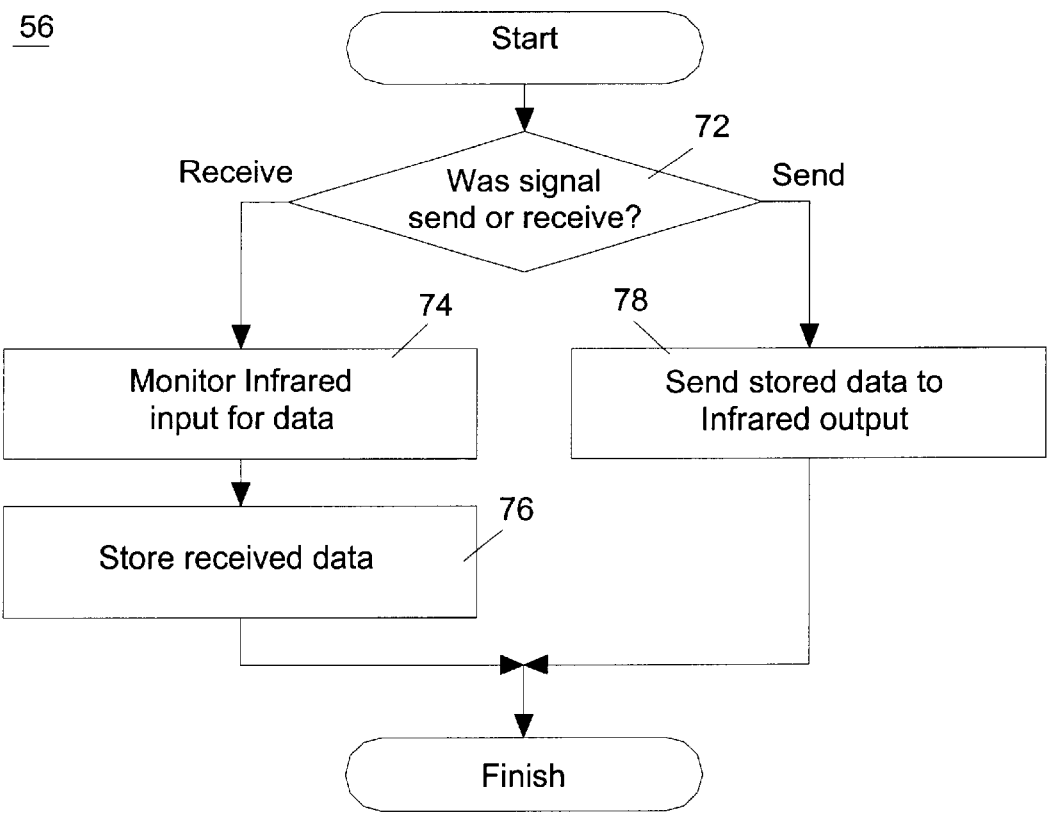
FIG. 8 is a flow chart of a routine of the procedure "Transfer data" shown in the flow chart of FIG. 5.

The pointing device program 50 may transfer data 56 to or from the host. Referring to FIG. 8. In one embodiment, the pointing device program 50 may determine if a send data or receive data signal was received 72. If a receive data signal was received, the program may monitor the controller input connected to the infrared receiver for data 74. Upon receiving data, the program may store the data in memory 76. If a send data signal was received, the program may send data stored in memory to the controller output device connected to the infrared transmitter 78.

Figure 9:
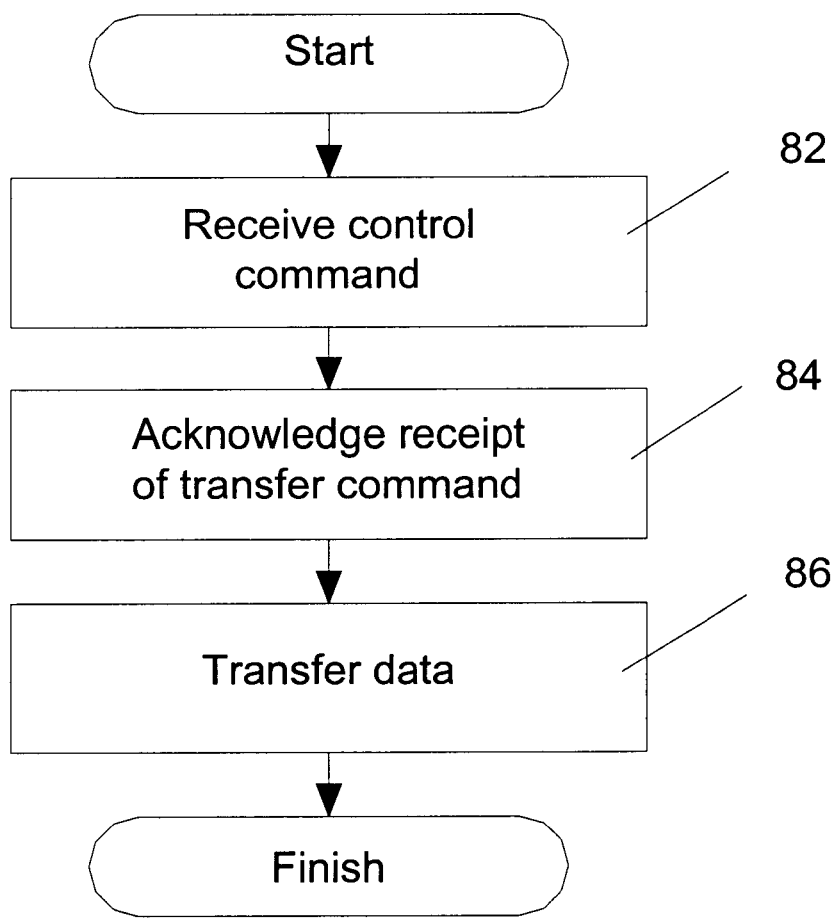
FIG. 9 is a flow chart indicating the processing by a host computer in one embodiment of the invention.

One embodiment of a flow chart of a host computer program for communicating with a pointing device is illustrated in FIG. 9 and designated in the aggregate as numeral 80. The computer program 80 may receive a control command 82, acknowledge receipt of a transfer command 84, and transfer data 86 to or from a pointing device.

Figure 10:
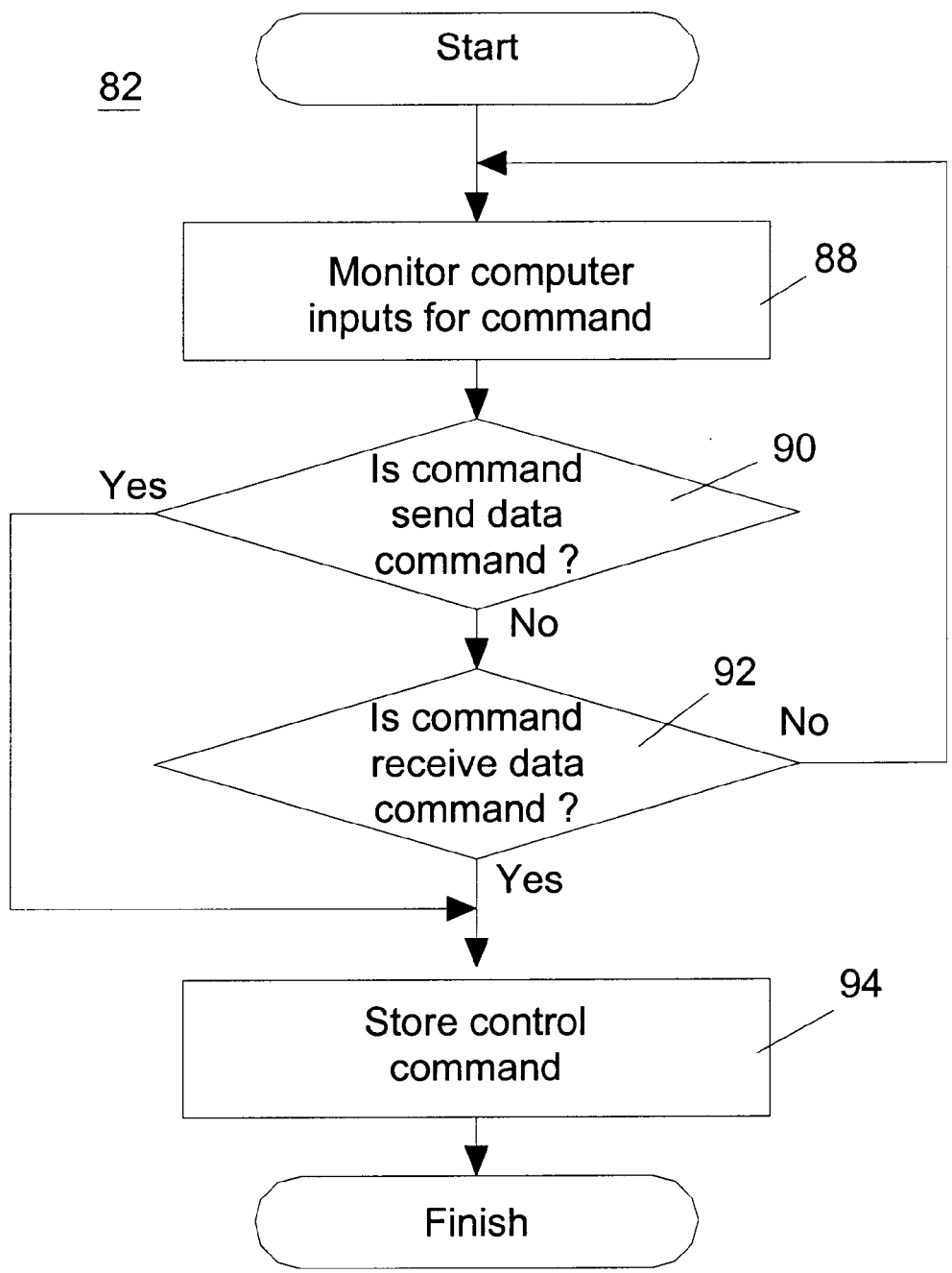
FIG. 10 is a flow chart of a routine of the procedure "Receive control command" shown in the flow chart of FIG. 9.

The host computer program 80 may receive a control command 82. Referring to FIG. 10. The host program 80 may monitor the computer input connected to an infrared receiver for a control command 88. Upon receiving a command, the program may determine if the command is a send data command 90. If the command is a send data command, the program may store the command for later processing 94. If the command is not a send data command, the program may determine if the command is a receive data command 92. If the command is not a receive data command, the program may continue monitoring the inputs for a command 88. If the command is a receive data command, the program may store the command for later processing 95.

Figure 11:
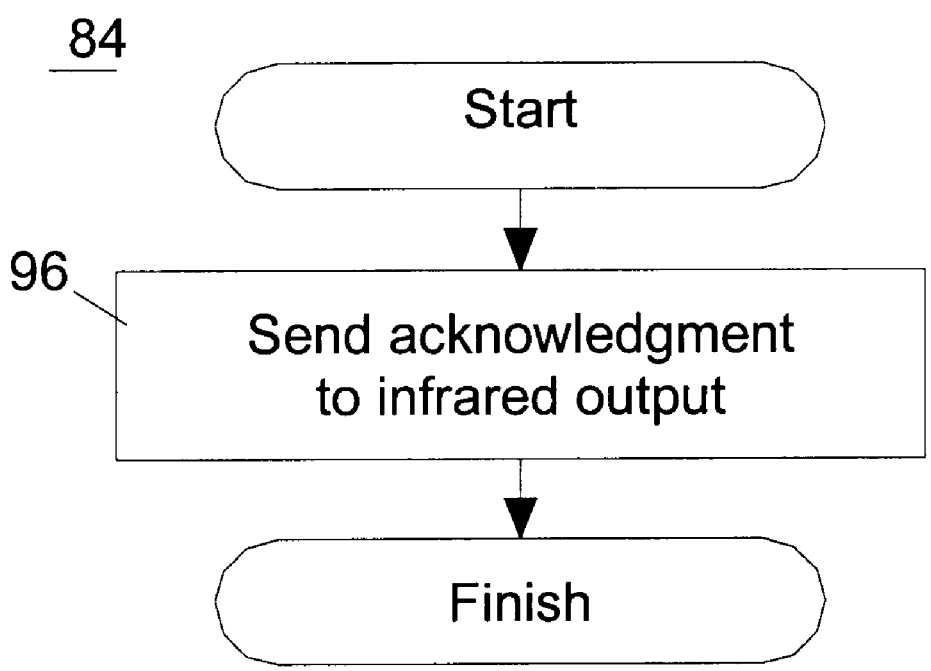
FIG. 11 is a flow chart of a routine of the procedure "Acknowledge receipt of transfer command" shown in the flow chart of FIG. 9.

The host computer program 80 may acknowledge receiving a command 96. Referring to FIG. 11. In one embodiment, the program 80 may send an acknowledgement to the outputs of the computer connected to the infrared transmitter 96.

The host computer program 80 may transfer data to or from the pointing device 86.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of communicating between a host computer and pointing device comprising:
    receiving a control signal from a toggle-actuated mechanism operably connected to the pointing device;
    initiating data transfer between the pointing device and the host computer in response to the control signal;
    receiving a receive data signal when the toggle mechanism is pulled into a position away from the computer; and
    receiving a send data signal when the toggle mechanism is pressed into a position towards the computer.

2. The method of claim 1 further comprising:
    transferring data between the pointing device and the host computer via an infrared data link.

3. The method of claim 1 wherein the control signal comprises a receive data signal to initiate a transfer of marked data from the computer to the painting device.

4. The method of claim 1 wherein the control signal comprises a send data signal to initiate a transfer of marked data from the pointing device to the computer.

5. Computer usable medium including a program for communicating between a host computer and pointing device comprising:
    computer readable code for receiving a control signal from a toggle-actuated mechanism on the pointing device;
    computer readable code for initiating data transfer between the pointing device and the host computer in response to the control signal;
    computer readable code for receiving a receive data signal when the toggle mechanism is pulled into a position away from the computer; and
    computer readable receiving a send data signal when the toggle mechanism is pressed into a position towards the computer.

6. The computer usable medium of claim 5 further comprising:
    computer readable code for transferring data between the pointing device and the computer via an infrared data link.

7. The computer usable medium of claim 5 wherein the control signal comprises a receive data signal to initiate a transfer of marked data from the computer to the pointing device.

8. The computer usable medium of claim 5 wherein the control signal comprises a send data signal to initiate a transfer of marked data from the pointing device to the computer.

9. An apparatus for communicating between a host computer and a pointing device comprising:
    means for sending a control signal;
    means for initiating data transfer between the pointing device and the host computer in response to the control signal;
    means for receiving a receive data signal when the toggle mechanism is pulled into a position away from the computer; and
    means for receiving a send data signal when the toggle mechanism is pressed into a position towards the computer.

10. A pointing device for communicating with a host computer comprising:
    a controller;
    memory operably attached to the controller; and
    a toggle mechanism operably attached to the controller, wherein a control signal is sent from the toggle mechanism to the controller to initiate data transfer between the host computer and the memory, wherein the control signal is a receive data signal when the toggle mechanism is pulled into a position away from the computer, and wherein the control signal is a send data signal when the toggle mechanism is pressed into a position towards the computer.

11. The pointing device of claim 10 further comprising:
    an infrared receiver and transmitter operably connected to the controller to allow transfer of data between the pointing device and the computer.

12. The pointing device of claim 10 wherein the toggle mechanism is operably moved between a neutral position, receive data position, and a send data position.

* * * * *